United States Patent
Davis, Jr. et al.

[15] 3,658,130
[45] Apr. 25, 1972

[54] MOBILITY CONTROL IN A MISCIBLE-TYPE CRUDE OIL RECOVER PROCESS

[72] Inventors: John A. Davis, Jr.; William J. Kunzman, both of Littleton, Colo.

[73] Assignee: Marathon Oil Company, Findlay, Ohio

[22] Filed: Aug. 19, 1970

[21] Appl. No.: 65,338

Related U.S. Application Data

[63] Continuation-in-part of Ser. No. 762,973, Sept. 26, 1968, abandoned.

[52] U.S. Cl.............................................................166/273
[51] Int. Cl...........................................................E21b 43/22
[58] Field of Search................................166/273–275, 305 R

[56] References Cited

UNITED STATES PATENTS

| | | | |
|---|---|---|---|
| 3,266,570 | 8/1966 | Gogarty | 166/273 |
| 3,406,754 | 10/1968 | Gogarty | 166/273 |
| 3,455,385 | 7/1969 | Gogarty | 166/274 |
| 3,500,922 | 3/1970 | O'Brien et al. | 166/273 |
| 3,500,924 | 3/1970 | Poettmann | 166/273 X |

*Primary Examiner*—Stephen J. Novosad
*Attorney*—Joseph C. Herring, Richard C. Willson, Jr. and Jack L. Hummel

[57] ABSTRACT

Improved oil recovery is obtained wherein highly saline water is used in an aqueous mobility buffer by incorporating about 0.05 percent to about 10 percent by weight of a water soluble surfactant in at least the front portion of the buffer, the portion of the mobility buffer equal to at least about 25 percent of the volume of a previously injected micellar dispersion. The mobility buffer is useful in secondary and tertiary oil recovery processes to displace a micellar dispersion through an oil-bearing subterranean formation toward a production means to recover oil therefrom. The mobility buffer has a sufficiently low mobility to protect against fingering in the process.

17 Claims, No Drawings

MOBILITY CONTROL IN A MISCIBLE-TYPE CRUDE OIL RECOVER PROCESS

CROSS REFERENCE TO RELATED APPLICATIONS

This is a continuation-in-part of our copending application, Ser. No. 762,973, filed Sept. 26, 1968, and now abandoned.

Also, U.S. Pat. No. 3,500,924, issued Mar. 17, 1970 teaches the use of surfactants in the front portion of the mobility buffer to facilitate emulsification of the back portion of a preceding micellar dispersion slug with the front portion of the mobility buffer slug.

BACKGROUND OF THE INVENTION

1. Field of the Invention

This invention relates to injecting a micellar dispersion, followed by a mobility buffer, into an oil-bearing subterranean formation and displacing the dispersion toward a production well to recover crude oil. A highly saline water can be used in the mobility buffer by incorporating surfactants within the front portion thereof.

2. Description of the Prior Art

Gogarty et al. teach in U.S. Pat. Nos. 3,254,714 and 3,275,075 that micellar dispersions are useful to recover crude oil from an oil-bearing subterranean formation. A mobility buffer, having a sufficiently low mobility to impart viscous stability to the process, is useful with these processes to obtain a more efficient oil recovery. The mobility buffer is generally an aqueous medium containing a mobility reducing agent—the amount of agent being sufficient to impart the desired mobility to the process. Examples of mobility agents include partially hydrolyzed high molecular weight polyacrylamides, polysaccharides, and any agent which effectively reduces the mobility of water flowing through a porous medium.

The water used in the mobility buffer is of prime importance. If a highly saline water is used, more of the mobility reducing agent is generally needed to obtain the desired mobility. Also, the oil recovery efficiency is generally adversely affected. Thus, if the process is being effected in a territory where available water is of a high salt content, the water will desirably have to be diluted with fresh water in order to obtain an economical and efficient flood.

Applicants have discovered that by incorporating water soluble surfactants in at least the front portion of the mobility buffer, a highly saline water solution can be used as a majority of the fluid in the mobility buffer. The overall effect is to obtain a more efficient flooding process while using highly saline water in the mobility buffer.

DESCRIPTION OF THE INVENTION

The term "micellar dispersion" as used herein is meant to include micellar solutions, microemulsions, "transparent" emulsions, etc. Specific examples of useful micellar solutions include those taught in U.S. Pat. Nos. 3,254,714 and 3,275,075 to Gogarty et al.; 3,307,628 to Sena; 3,356,138 to Davis et al.; 3,506,070 to Jones and 3,497,006 to Jones et al.

The micellar dispersions of this invention can be either oil-external or water-external, but are preferably oil-external. They contain hydrocarbon, aqueous medium, surfactant sufficient to impart micellar characteristics to the dispersion, and optionally consurfactant(s) and/or electrolyte(s). Examples of volume amounts include about 4 percent to about 60 percent or more, of hydrocarbon, about 10 percent to about 90 percent aqueous medium, at least about 4 percent surfactant, about 0.01 percent to about 20 percent of cosurfactant, and about 0.001 percent to about 5 percent or more by weight (based on the aqueous medium) of electrolyte. A high water content is generally desired to improve process economics.

Examples of hydrocarbon include crude oil, partially refined fractions of crude oil, and refined fractions thereof. Specific examples include side cuts from crude oil columns, lubricating oils, mineral oil, gas oils, crude column overheads, kerosene, gasoline, naphthas, and liquefied petroleum gases.

The aqueous medium used to make-up the dispersion can be soft, brackish, or brine water. Preferably, the water is soft, but it can contain small amounts of salts which are preferably compatible with the formation fluids. In some instances, it is desired the aqueous medium contain large amounts of salts characteristic of the salts within the subterranean formation.

The surfactant can be nonionic, cationic, or anionic. Specific examples of useful surfactants can be found in U.S. Pat. No. 3,275,075 to Gogarty et al. Preferably, the surfactant is a petroleum sulfonate, also known as alkyl aryl naphthenic sulfonate, and preferably contains a monovalent cation. Examples of preferred surfactants are sodium and ammonium petroleum sulfonates having an average equivalent weight within the range of about 350 to about 520 and more preferably about 390 to about 470. The sulfonate molecule can have more than one sulfonate grouping. The sulfonate can be a mixture of any two or more low, medium, and high average equivalent weight sulfonates or a mixture of two or more different surfactants.

The cosurfactants, also identified as cosolubilizers and semi-polar organic compounds, can be alcohols amino compounds, esters, aldehydes, ketones, and like materials containing from one to about 20 or more carbon atoms. More preferably, the cosurfactant contains about three to about 16 carbon atoms and is preferably an alcohol. Examples of useful alcohols include isopropanol, n- and isobutanol, amyl alcohols such as n-amyl alcohol, 1 and 2-hexanol, 1- and 2-octanol, decyl alcohols, alkaryl alcohols such as p-nonyl phenol, alcohols containing two or more hydroxy groupings and can optionally contain an ether group(s) etc. within the alcohol, and alcoholic liquors such as fusel oil. Preferably, the concentration can be within the range of about 0.1 percent to about 5 percent. Mixtures of two or more cosurfactants are also useful.

The electrolytes include inorganic bases, inorganic acids, inorganic salts, organic bases, organic acids, and organic salts which are strongly or weakly ionized. The inorganic bases, acids, and salts are preferred, specific examples include sodium hydroxide, sodium chloride, sodium sulfate, hydrochloric acid, sulfuric acid, and sodium nitrate. Additional examples of useful electrolytes can be found in U.S. Pat. No. 3,330,343 to Tosch et al. The electrolyte can be the salts within brackish or brine water.

The micellar dispersion is first injected into the oil-bearing subterranean formation. This is followed by a mobility buffer, one purpose being to impart a favorable mobility to the flooding process. For example, the mobility buffer protects the micellar dispersion from invasion by the drive water which follows the mobility buffer. By maintaining a favorable mobility condition throughout the process, or most of the flooding process, a more efficient and effective flooding operation can be obtained.

The mobility buffer is composed of an aqueous medium and a mobility reducing agent. The purpose of the mobility reducing agent is to impart to the mobility buffer a sufficiently low mobility to protect against fingering. The aqueous medium in the mobility buffer is desirably a cheap one or one that is locally available. This invention teaches that highly saline solutions can be used as the aqueous medium within the mobility buffer by incorporating water soluble surfactants within the mobility buffer. Examples of saline solutions include concentrations up to and above 100,000 ppm of dissolved salts. The mobility reducing agent can be any chemical soluble in the water which imparts a lower mobility and is compatible in the overall flooding process. Specific examples include polysaccharides, partially hydrolyzed, high molecular weight polyacrylamides, e.g. those marketed under the trade name of Pusher, a trademark of Dow Chemical Company, Midland, Michigan; in general, water soluble polyelectrolytes having molecular weights in excess of 500,000, etc. Oil/water emulsions are not intended to be within the definition of mobility buffer as used herein.

The surfactants useful in the mobility buffer include any water-soluble surfactant. The surfactants can be anionic, nonionic, cationic, or amphoteric. Specific examples include those water-soluble surfactants previously identified as surfactants useful in the micellar dispersion: Santomerse 85, a dodecyl benzene sodium sulfonate, manufactured by Monsanto Chemical Company; Duponol ME 939, technical grade sodium lauryl sulfate, manufactured by E. I. DuPont deNemours & Company; Gantrez AN-119, a poly(methyl vinyl ether/maleic anhydride) manufactured by General Aniline & Film Corporation, Dyestuff & Chemical Division; Brij 78 4-156, a polyoxyethylene stearyl ether, manufactured by Atlas Chemical Industries; Duponol WA 428, technical grade sodium lauryl sulfate, manufactured by E. I. DuPont deNemours & Company; and Duponol G 871, a fatty alcohol amine sulfate manufactured by E. I. DuPont deNemours & Company. Also included are alkyl and aryl, and substituted alkyl and aryl sulfates, carbonates, nitrates, amides and other water-soluble salts; hydrocarbon sulfonates, e.g. petroleum sulfonate, having an average equivalent weight within the range of about 150 to about 400 and more preferably about 200 to about 350 (the unneutralized sulfonic acids obtained in manufacturing petroleum sulfonates are also useful and are meant to be included within the term sulfonates); polyoxyethylene alkylethers, condensates of ethylene oxide with an alkyloxide (e.g. propylene oxide), and an alkyl hydroxide (e.g. propylene glycol); ethylene diamine tetracetic acid; and like materials. Preferably, the surfactant is compatible with the other components used in the process and with the connate fluids. In addition, the surfactant is desirably chosen such that it will not be readily adsorbed on the reservoir rock. Amounts within the range of about 0.05 percent to about 10 percent, and more preferably from about 0.2 percent to about 5 percent, based on the aqueous medium within the mobility buffer, impart desired characteristics to the process.

The volume of the mobility buffer that contains the surfactant can vary from that volume equal to about 25 percent to 100 percent of the micellar dispersion volume previously injected to at least a majority of the mobility buffer volume. Preferably, that volume equal to about 50 percent of the micellar dispersion volume to less than 50 percent of mobility buffer volume and, most preferably, about 50 percent to about 100 percent of the micellar dispersion volume contains surfactant.

The following example specifically illustrates working embodiments of the invention. This example is not to be interpreted as limiting the invention. Rather, equivalents obvious to those skilled in the art are intended to be equated within the scope of the invention as defined by the specification and appended claims. Unless otherwise specified, all percents are based on volume.

EXAMPLE

Berea sandstone cores, 4 feet by 2 inches in diameter, are flooded with 5 percent pore volume of a micellar dispersion of 55.0 percent crude column overhead, 10.4 percent of an ammonium petroleum sulfonate having an average equivalent weight of about 420–440 and being about 62 percent active, 31.9 percent of an aqueous medium containing about 10,200 ppm of dissolved solids (salts), and about 1.85 percent of alcohols (1.7 percent isopropyl alcohol and 0.15 percent nonyl phenol). The micellar dispersions are followed 1.2 pore volumes of a mobility buffer, the composition of the mobility buffer being defined within Table I. The mobility reducing agent is DOW 500 Series Pusher, a partially hydrolyzed high molecular weight polyacrylamide marketed by Dow Chemical Company, Midland, Michigan. Half of the runs do not contain a surfactant within the mobility buffer whereas the other half do contain surfactant. The surfactant is Gafen FA-5, a trademark of General Aniline & Film Corporation, identified as a dialkyl phenoxy poly(ethyleneoxy) ethanol. The Berea sandstone cores are first saturated with an aqueous medium containing about 20,000 ppm. total dissolved solids, flooded with crude oil (obtained from the Henry lease, Robinson sand, Crawford County, Illinois), and then flooded with an aqueous medium containing about 20,000 ppm of dissolved solids to residual oil saturation. The results of the tests are indicated in Table I:

TABLE I

Mobility Buffer Composition

| Sample | Salt/Level (ppm of NaCl) | Surfactant (%) | ppm of dow 500 Series Pusher | % Recovery of Oil in Core |
|---|---|---|---|---|
| A | 5,000 | — | 2100 | 74.0 |
| A¹ | 5,000 | 2.5 | 2100 | 79.5 |
| B | 10,000 | — | 2900 | 81.0 |
| B¹ | 10,000 | 2.5 | 2900 | 81.0 |
| C | 50,000 | — | 4500 | 48.0 |
| C¹ | 50,000 | 2.5 | 4500 | 76.5 |
| D | 100,000 | — | 5200 | 44.5 |
| D¹ | 100,000 | 2.5 | 5200 | 87.5 |

The above data indicate, especially at the 50,000 and 100,000 ppm level of NaCl in the mobility buffer, that the incorporation of surfactant within the mobility buffer improves the oil recovery. Thus, highly saline water can be used efficiently in the mobility buffer by the addition of such surfactants.

What is claimed is:

1. In an improved process of recovering oil from an oil-bearing subterranean formation wherein a volume of micellar dispersion is injected into the formation and displaced toward a production means by an aqueous mobility buffer fluid and a water drive to recover crude oil through the production means, the improved process step comprising incorporating into the front volume of the mobility buffer fluid, the front volume equal to at least about 25 percent of the volume of the micellar dispersion, a water-soluble surfactant to permit the use of highly saline water in the mobility buffer fluid.

2. The process of claim 1 wherein the micellar dispersion is comprised of hydrocarbon, surfactant, and water.

3. The process of claim 2 wherein the micellar dispersion contains cosurfactant.

4. The process of claim 2 wherein the micellar dispersion contains electrolyte.

5. The process of claim 1 wherein from about 0.05 percent to about 10 percent of water-soluble surfactant is incorporated into the front volume of the mobility buffer.

6. The process of claim 1 wherein the mobility buffer contains up to 100,000 ppm of salt dissolved in the water.

7. The process of claim 1 wherein the front volume of the mobility buffer has a mobility about equal to or less than that of the formation fluids flowing ahead of the micellar solution.

8. The process of claim 1 wherein the front volume of the mobility buffer has a mobility about equal to or less than that of the micellar dispersion flowing in the formation.

9. The process of claim 1 wherein the front volume of the mobility buffer containing the surfactant is equal to about 50 percent to about 100 percent of the volume of the micellar dispersion.

10. In an improved process of flooding an oil-bearing subterranean formation wherein a volume of a micellar dispersion comprised of surfactant, water and hydrocarbon is injected into the formation and displaced toward a production means by an aqueous mobility buffer and a water drive to recover crude oil through said production means, the improved process step comprising incorporating from about 0.05 percent to about 10 percent of a water-soluble surfactant into the front volume of the mobility buffer, the front volume equal to at least about 50 percent of the volume of injected micellar dispersion, to permit the use of highly saline water in the mobility buffer.

11. The process of claim 10 wherein from about 0.2 percent to about 5 percent of surfactant is incorporated into the front volume of the mobility buffer.

12. The process of claim 10 wherein the surfactant in the front volume of the mobility buffer is a condensate of ethylene oxide with a hydrophobic condensate of propylene oxide and propylene glycol.

13. The process of claim 10 wherein the surfactant in the front volume of the mobility buffer is an alkyl phenoxypoly (ethyleneoxy) ethanol containing at least one alkyl grouping.

14. The process of claim 10 wherein the surfactant in the front volume of the mobility buffer is nonionic.

15. The process of claim 10 wherein the surfactant in the front volume of the mobility buffer is anionic.

16. The process of claim 10 wherein the mobility of the front volume of the mobility buffer is about equal to or less than that of the micellar dispersion.

17. The process of claim 10 wherein the front volume of the mobility buffer containing the surfactant is equal to about 50 to about 100 percent of the volume of the micellar dispersion.

* * * * *